Nov. 27, 1956  R. M. HORTVET  2,772,082
STRESS RELIEVING APPARATUS
Filed July 27, 1950

INVENTOR.
Richard M. Hortvet
BY Andrus & Scales
ATTORNEYS.

2,772,082
STRESS RELIEVING APPARATUS

Richard M. Hortvet, Milwaukee, Wis., assignor to A. O. Smith Corporation, Milwaukee, Wis., a corporation of New York Application July 27, 1950, Serial No. 176,104

2 Claims. (Cl. 263—4)

This invention relates to apparatus for, and method of annealing to relieve stresses in large hollow articles such as welded pipes or pressure vessels.

More particularly the invention is concerned with stress-relieving very large pressure vessels after the same have been placed in operative position.

In fabricating large pressure vessels such as are used in the oil industry, or such as a coke drum for instance, considerable welding is used in joining the various parts of the particular vessels together. Vessels which are so large that they cannot be shipped from a factory to the site of erection in one piece are usually fabricated and shipped in two or more pieces and then welded together in the field either before or during erection.

The welding occasions stresses that must be relieved before putting the apparatus in use.

It has been customary to stress-relieve such large vessels in built-up temporary stress-relieving furnaces at the site of erection which necessitates the outlay of considerable expense.

The principal object of this invention is to provide apparatus for stress-relieving pressure vessels after they have been erected in the field.

Another object is to provide simple stress-relieving apparatus for large welded pressure vessels A further object is to provide simple stress-relieving apparatus for use with erected vessels whereby it is unnecessary to construct huge knock-down furnaces for stress-relieving purposes.

Still another object is to provide apparatus whereby large vessels may be stress-relieved by the use of a substantially long luminous flame disposed within the vessel.

Another object is to provide apparatus for and a method of stress-relieving large vessels in the field by the use of a substantially long luminous flame and to control the relieving of stresses in various parts of the vessel by controlling the height of the luminous flame.

Figure 1:
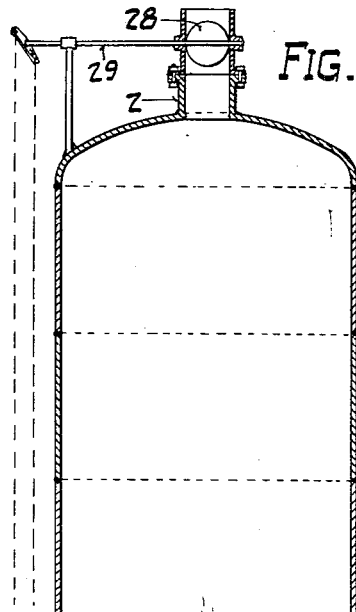
Figure 1 is a view of a vertical medial section of a large pressure vessel disposed above the apparatus of the invention. The upper portion of the apparatus is shown in vertical medial section while the blower, fuel, and air system is shown diagrammatically.
Figure 2:
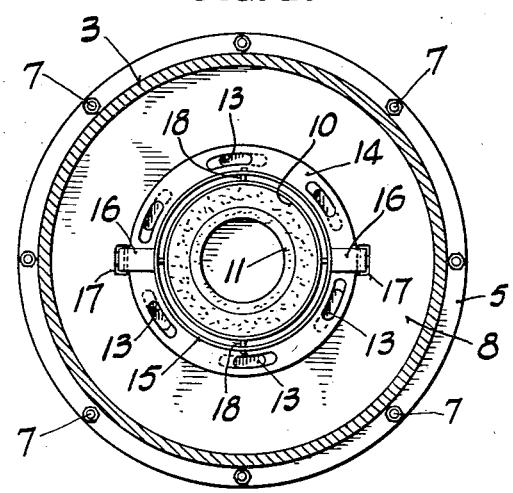
Fig. 2 is an enlarged sectional view taken on line 2—2 of Fig. 1.
Figure 3:
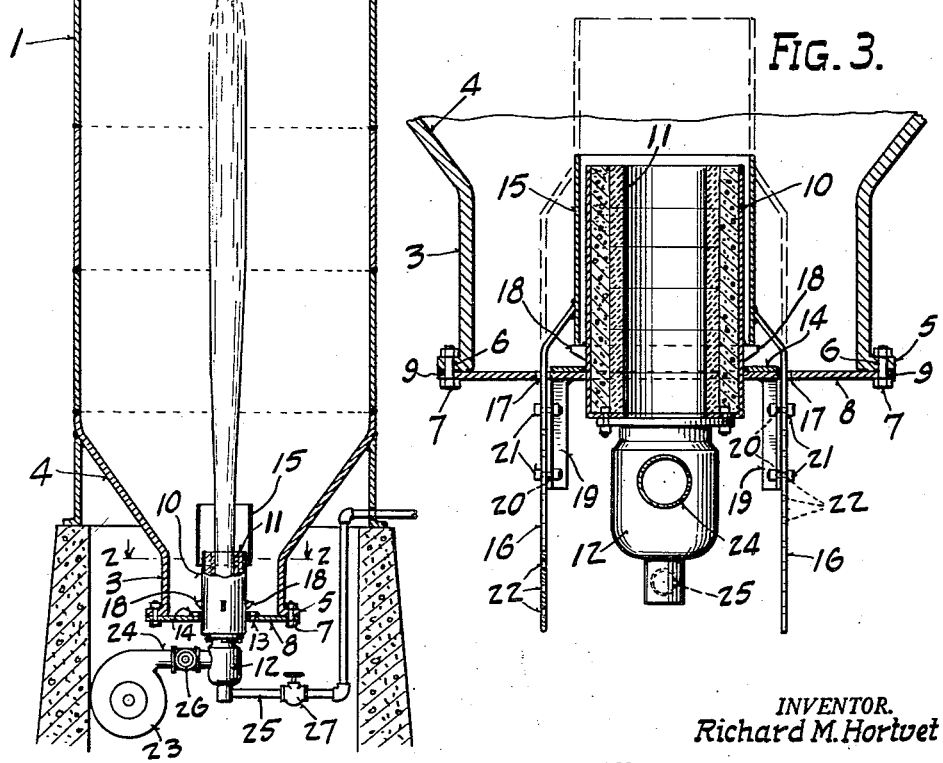
Fig. 3 is an enlarged sectional view of the burner and blower apparatus with the sleeve in lowered position.

Referring to the drawing there is shown a large coke drum having a generally cylindrical shell 1, an upper flanged connection 2, and a manway 3 which is joined to the cylindrical shell by the conical section 4.

The end of the manway is flanged at 5 which is provided with a plurality of apertures 6 to receive bolts 7 utilized for securing the flange to a burner plate 8 as hereinafter explained, and which later secure the vessel to an inlet.

Burner plate 8 is likewise provided with a plurality of apertures 9 adjacent its outer circumferential edge. When apertures 6 and 9 are brought into registry, bolts 7 extending therethrough serve to secure the drum to the burner plate for further operation.

A sheet metal sleeve 10 of generally cylindrical shape is fixed in the center of the burner plate and extends upwardly therefrom for a substantial distance and also below the horizontal plane of the burner plate. A fire box 11 is disposed within sleeve 10 and serves to confine and direct upwardly a flame as will be later explained. The lower edge of the sleeve 10 is preferably flanged so that it may be secured to a burner 12.

A plurality of apertures 13 are preferably equally spaced adjacent the inner circumferential edge of burner plate 8 and serve to provide additional air to the interior of the vessel to be treated. A shutter plate 14 is disposed on the upper surface of the burner plate and by rotating the shutter plate the amount of air passing through apertures 13 may be regulated.

A second sheet metal cylindrical sleeve 15 is disposed to encompass the inner fixed sleeve 10. The outer sleeve is adjustable vertically and is provided on diametrically opposite sides thereof with handles 16 which are secured preferably by welding to the outer surface of the sleeve. The upper ends of the handles are angularly disposed with relation to the sleeve and are formed to extend outwardly from the sleeve to adjacent the burner plate where they then extend vertically downwardly through apertures 17 in the burner plate 8. Downward movement of the adjustable sleeve is limited by stops 18 secured to the outer surface of the fixed sleeve 10.

Brackets 19 of angle iron are secured to the lower surface of the burner plate in close proximity to apertures 17 and are provided with apertures 20 through one leg of each bracket to receive bolts 21 which may be inserted through a desired aperture 22 in the vertically disposed portion of the handle. It will thus be seen that the outer sleeve may be raised or lowered from outside the vessel being treated and when in its uppermost position serves to direct the heat of the flame from the burner 12 upwardly so that the conical section 4 of the drum will not become overheated.

The outer sleeve 15 is raised or lowered to control the length of the flame to heat the drum uniformly top to bottom.

A blower 23 preferably of fixed speed is disposed outside the manway of the drum and serves to force air and gas into the drum at low velocity. Air line 24 and gas line 25 are provided with suitable valves 26 and 27, respectively, to control the amount of air and gas which is permitted to enter the burner. A suitable pilot, not shown, is connected into the burner and functions to ignite the incoming gas.

A damper is disposed on the upper flanged connection 2 and may be operated by a damper rod 29. As will later be explained, manipulation of the damper serves to control the pressure inside the drum and direct the heat from the flame to various parts of the article which is being stress-relieved.

Burner-plate 8 may, if desired, be provided with a plurality of peep holes, not shown, which are covered with heat-resistant glass so that visual inspection may be had of the interior of the drum, while being heat treated.

To operate the above apparatus, and after burner plate 8 with its described appurtenances has been removably secured to the flanged manway, damper 28 is moved to its open position. Outer sleeve 15 is raised to its uppermost position and the oppositely disposed handles 16 are removably secured to brackets 19. Blower 23 is next started and is permitted to run for a short time to clear the drum of any likely combustible mixture which may be inside the drum. The air valve is next opened slightly and then the pilot light is lit. Gas valve 27 is next opened slightly and the pilot light serves to ignite the mixture of gas and air.

The flame employed in stress-relieving the vessel in accordance with this invention is a luminous flame. In other words, it is a flame resulting, not from the mixture of gas and air in the burner, but one resulting from the gas being forced to rise in the vessel and then burning upwardly inside the vessel. A flame of this type, produced by the apparatus described will extend upwardly for a distance of approximately thirty feet.

As an example of stress-relieving a coke drum with the appartus described, and according to the method of the invention, a coke drum approximately ninety-five feet in height and seventeen feet in diameter was heat treated successfully in approximately fifty hours. It was necessary to bring the temperature of the drum to approximately 1050° F. and this was accomplished by controlling the amount of air and gas admitted to the inside of the drum, while at the same time, adjusting the damper opening and the air intake through the apertures 13 in the burner plate. After approximately the entire length of the drum had been brought up to or near the desired temperature, the adjustable sleeve 15 was lowered so that the conical section 4 of the drum could be heated to a temperature commensurate with that of the balance of the drum. Damper 28 may also be manipulated to retard the escape of hot gases from the top of the vessel. When thermo-couples disposed at various points in the vessel disclose that the desired temperature has been reached, the vessel is permitted to soak at this temperature for a period of time requisite to complete relieving of the stresses of fabrication. After the soaking period is completed the temperatures within the vessel are reduced, while still controlled, until they are reduced to a point where no further control is necessary.

Various embodiments of the invention may be employed within the scope of the following claims.

I claim:

1. Apparatus for relieving stresses of fabrication in large pressure vessels which have been erected in their intended place of use, which comprises a metal plate adapted to be removably secured to the lower end of the vessel, a cylindrical sheet metal sleeve secured to said plate and extending upwardly through an opening in the plate, a second cylindrical sheet metal sleeve concentric with the first sleeve and encompassing a substantial portion of the latter, said second sleeve being adaptable for vertical movement with respect to said first sleeve, means secured to said second sleeve and extending downwardly through said plate to effect vertical movement of the second sleeve, a generally cylindrical fire box secured to the inner surface of said first sleeve, a plurality of circumferentially spaced apertures in said plate adjacent said first sleeve, rotatable means disposed above said plate and adapted to control the amount of air passing through said apertures, a burner removably secured to said first sleeve and connecting with said fire box, a source of gas supply and a source of air supply and means to deliver said gas and air through said burner and fire box into the interior of the vessel where combustion is effected and the heat therefrom raises the temperature of the metal of the vessel being treated.

2. Apparatus for relieving stresses of fabrication in large pressure vessels which have been erected in their intended place of use, which comprises a metal plate adapted to be removably secured to the lower end of the vessel, a cylindrical sheet metal sleeve secured to said plate and extending upwardly through an opening in the plate, a second cylindrical sheet metal sleeve concentric with the first sleeve and encompassing a substantial portion of the latter, said second sleeve being adaptable for vertical movement with respect to said first sleeve, means secured to said second sleeve and extending downwardly through said plate to effect vertical movement of the second sleeve, means secured to the outer surface of the first sleeve to limit movement of the second sleeve, a fire box secured to the inner surface of said first sleeve, a plurality of circumferentially spaced apertures in said plate adjacent said first sleeve, rotatable means disposed above said plate and adapted to control the amount of air passing through said apertures, a burner removably secured to said first sleeve and connecting with said fire box, a source of gas supply and a source of air supply, and means to deliver said gas and air through said burner and fire box into the interior of the vessel where combustion is effected and the heat therefrom raises the temperature of the metal of the vessel being treated and with vertical adjustment of the second sleeve serving to control height of the flame of combustion within the vessel to uniformly heat the same.

References Cited in the file of this patent

UNITED STATES PATENTS

| | | |
|---|---|---|
| 316,059 | Randol | Apr. 21, 1885 |
| 494,484 | McRae | Mar. 28, 1893 |
| 584,861 | Dunham | June 22, 1897 |
| 906,879 | Heynemann | Dec. 15, 1908 |
| 986,663 | Weintz | Mar. 14, 1911 |
| 1,016,457 | Totten | Feb. 6, 1912 |
| 1,445,220 | Lee | Feb. 13, 1923 |
| 1,719,331 | Kemp | July 2, 1923 |
| 1,745,403 | Caugherty | Feb. 4, 1930 |
| 2,137,523 | Bergstrom | Nov. 22, 1938 |
| 2,309,699 | Huff | Feb. 2, 1943 |
| 2,497,321 | Pattinson et al. | Feb. 14, 1950 |
| 2,616,790 | Swindin | Nov. 4, 1952 |